US012811501B2

(12) United States Patent
Majmunovic et al.

(10) Patent No.: US 12,811,501 B2
(45) Date of Patent: Nov. 24, 2026

(54) SWITCHING CONVERTER WITH AUXILIARY DRIVER

(71) Applicant: TEXAS INSTRUMENTS INCORPORATED, Dallas, TX (US)

(72) Inventors: Branko Majmunovic, Dallas, TX (US); Sombuddha Chakraborty, Redwood City, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 68 days.

(21) Appl. No.: 18/790,329

(22) Filed: Jul. 31, 2024

(65) Prior Publication Data

US 2026/0039199 A1 Feb. 5, 2026

(51) Int. Cl.

*H02M 3/158* (2006.01)
*H02M 1/00* (2007.01)
*H02M 3/00* (2006.01)

(52) U.S. Cl.

CPC ......... *H02M 3/158* (2013.01); *H02M 1/0058* (2021.05); *H02M 3/01* (2021.05)

(58) Field of Classification Search

CPC ....... H02M 1/0058; H02M 3/158; H02M 3/01
See application file for complete search history.

(56) References Cited

U.S. PATENT DOCUMENTS

2004/0257272 A1* 12/2004 Jacobson ................. H01Q 3/26 342/175
2023/0139340 A1* 5/2023 Peron .................... H02M 1/083 363/17
2024/0250600 A1* 7/2024 Penttonen ........... H02M 1/0058

FOREIGN PATENT DOCUMENTS

WO WO-2019224431 A1 * 11/2019 .............. H02M 1/38

* cited by examiner

*Primary Examiner* — Ryan Johnson
(74) *Attorney, Agent, or Firm* — Zhenhai Fu; Charles F. Koch

(57) ABSTRACT

An apparatus includes a first transistor, a second transistor, a third transistor, a fourth transistor, an inductor, and a current injection circuit. The first transistor is coupled between a power terminal and a first switching terminal. The first transistor has a first control terminal. The second transistor is coupled between the first switching terminal and a reference terminal. The second transistor has a second control terminal. The third transistor is coupled between the power terminal and a second switching terminal. The third transistor has a third control terminal. The fourth transistor is coupled between the second switching terminal and the reference terminal. The fourth transistor has a fourth control terminal. The inductor is coupled between the first and second switching terminals. The current injection circuit is coupled to the first switching terminal.

22 Claims, 13 Drawing Sheets

SWITCHING CONVERTER WITH AUXILIARY DRIVER

BACKGROUND

A DC-DC converter is an electronic circuit that converts an input direct current (DC) voltage into one or more DC output voltages that are higher or lower in magnitude than the input DC voltage. A DC-DC converter that generates an output voltage lower than the input voltage is termed a buck or step-down converter. A DC-DC converter that generates an output voltage higher than the input voltage is termed a boost or step-up converter.

Some DC-DC converter topologies, such as switch mode DC-DC converters, include a drive/power switch coupled at a switch node to an energy storage element, such as an inductor or a transformer. Electrical energy is transferred through the energy storage element to a load by alternately opening and closing the switch as a function of a switching signal. The amount of electrical energy transferred to the load is a function of the ON/OFF duty cycle of the switch and the frequency of the switching signal. Switch mode DC-DC converters are widely used in electronic devices in which efficient use of power is desirable.

SUMMARY

In one example, an apparatus includes a first transistor, a second transistor, a third transistor, a fourth transistor, an inductor, and a current injection circuit. The first transistor is coupled between a power terminal and a first switching terminal. The first transistor has a first control terminal. The second transistor is coupled between the first switching terminal and a reference terminal. The second transistor has a second control terminal. The third transistor is coupled between the power terminal and a second switching terminal. The third transistor has a third control terminal. The fourth transistor is coupled between the second switching terminal and the reference terminal. The fourth transistor has a fourth control terminal. The inductor is coupled between the first and second switching terminals. The current injection circuit is coupled to the first switching terminal.

In another example, a method includes injecting a first current into a first switching terminal of a first half bridge circuit. The method also includes, after injecting the first current, switching a state of the first half bridge to inject a second current, via an inductor, into a second switching terminal of a second half bridge. The method further includes, after injecting the second current, switching a state of the second half bridge.

In a further example, a system includes a first half bridge, a second half bridge, an inductor, a current injection circuit, and a controller. The first half bridge includes a first transistor and a second transistor coupled to a first switching terminal. The second half bridge includes a third transistor and a fourth transistor coupled to a second switching terminal. The inductor is coupled between the first switching terminal and the second switching terminal. The current injection circuit is coupled to the first switching terminal. The controller is coupled to the first transistor, the second transistor, the third transistor, and the fourth transistor.

DETAILED DESCRIPTION

Figure 1:
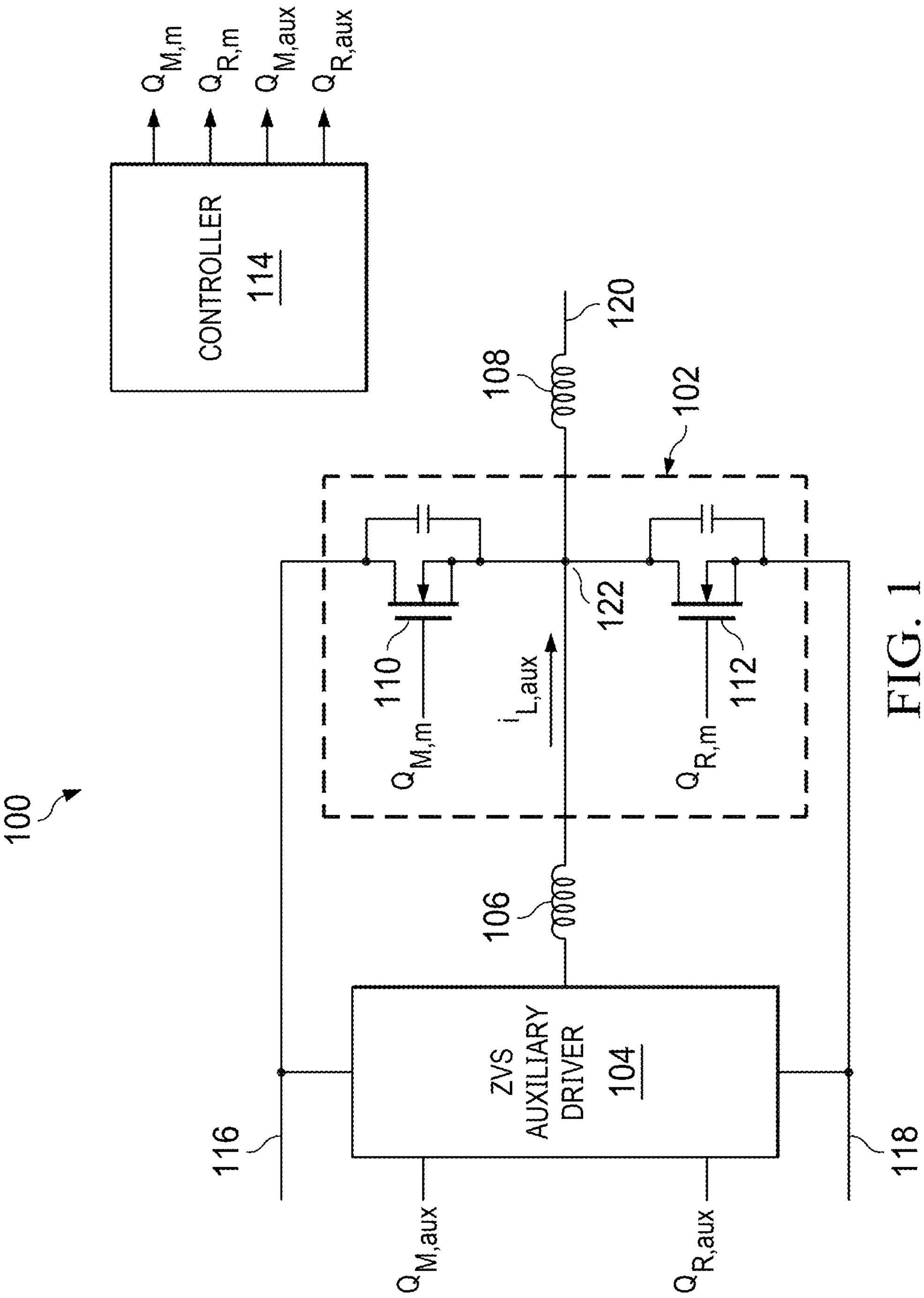
FIG. 1 is a schematic diagram of an example switching converter that includes an auxiliary driver circuit.

FIG. 1 is schematic diagram of an example switching converter 100. The switching converter 100 includes a half bridge 102, a zero voltage switching (ZVS) auxiliary driver 104, inductors 106 and 108, and a controller 114. The half bridge 102 includes transistors 110 and 112. The transistors 110 and 112 may be n-channel field effect transistors (NFETs). The transistor 110 is coupled between a first terminal 116 of the switching converter 100, and a switching terminal 122 of the half bridge 102. A first terminal (e.g., drain) of the transistor 110 is coupled to the terminal 116. A second terminal (e.g., source) of the transistor 110 is coupled to the switching terminal 122. A control terminal (e.g., gate) of the transistor 110 is coupled to an output of the controller 114 for receipt of a control signal $Q_{M,m}$. The transistor 112 is coupled between the switching terminal 122 and a reference terminal 118 (e.g., a ground terminal). A first terminal (e.g., drain) of the transistor 112 is coupled to the switching terminal 122. A second terminal (e.g., source) of the transistor 112 is coupled to the reference terminal 118. A control terminal (e.g., gate) of the transistor 112 is coupled to an output of the controller 114 for receipt of a control signal $Q_{R,m}$. The inductor 108 is coupled between the transistor 112 and a terminal 120 of the switching converter 100.

The ZVS auxiliary driver 104 is coupled between the terminal 116 and reference terminal 118 in parallel with the half bridge 102. The ZVS auxiliary driver 104 has a first terminal coupled to the terminal 116, a second terminal coupled to the reference terminal 118. An output of the ZVS auxiliary driver 104 is coupled to the switching terminal 122 via the inductor 106. A first input of the ZVS auxiliary driver 104 is coupled to an output of the controller 114 for receipt of a control signal $Q_{M,aux}$. A second input of the ZVS auxiliary driver 104 is coupled to an output of the controller 114 for receipt of a control signal $Q_{R,aux}$.

The controller 114 controls switching in the half bridge 102 and the ZVS auxiliary driver 104 to charge and discharge the inductor 108 and inductor 106. The switching converter 100 may operate as a step-down converter or a step-up converter based on the control signals provided by the controller 114. The efficiency of the switching converter 100 is improved by providing ZVS of the transistor 110. In the switching converter 100, the ZVS auxiliary driver 104 and the inductor 106 provide a current $i_{L,aux}$ to the switching terminal 122 that can reduce the voltage across the transistor 110 to zero volts or near zero volts, prior to switching the transistor 110. Accordingly, the controller 114 can change the state of the transistor 110 with zero volts thereacross to increase the efficiency of the switching converter 100.

Figure 2A:
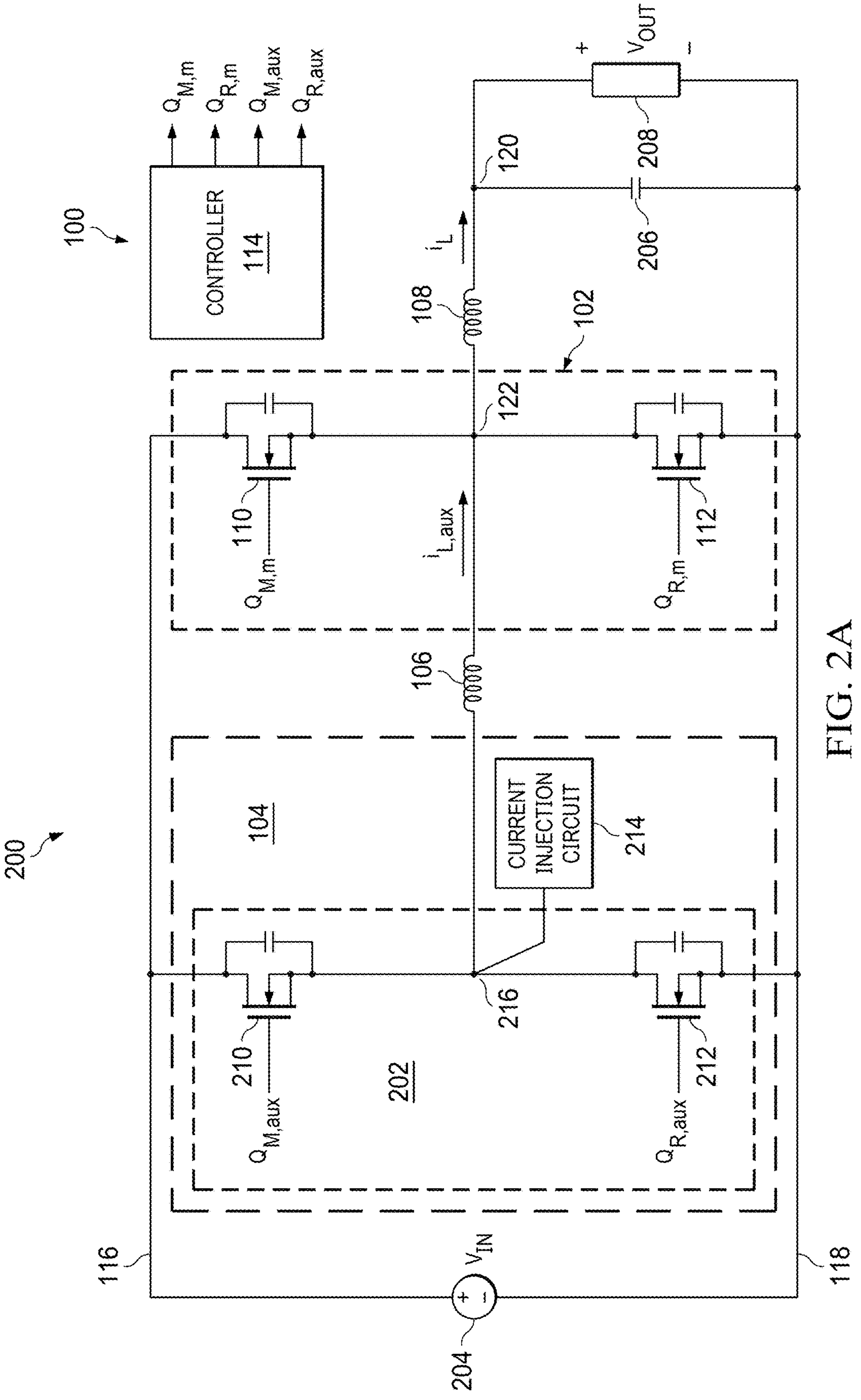
FIG. 2A is a schematic diagram of an example switching converter having an auxiliary driver circuit that includes a current injection circuit.

FIG. 2A is schematic diagram of an example switching converter 200 that includes the switching converter 100 and shows detail of the ZVS auxiliary driver 104. The switching converter 200 is a step down converter. The terminal 116 is coupled to a voltage source 204. The terminal 120 is coupled to a capacitor 206. The voltage source 204 is coupled between the terminal 116 and the reference terminal 118. The voltage source 204 can be a battery or a power supply that provides an input voltage $V_{IN}$. The capacitor 206 is coupled between the terminal 120 and the reference terminal 118. A load circuit 208 is also coupled between the terminal 120 and the reference terminal 118. The load circuit 208 is powered by the voltage source 204 via the switching converter 200.

The ZVS auxiliary driver 104 includes a half bridge 202 and a current injection circuit 214. The half bridge 202 includes transistors 210 and 212. The transistors 210 and 212 can be NFETs. The transistor 210 is coupled between the terminal 116 of the switching converter 100, and a switching terminal 216 of the half bridge 202. A first terminal (e.g., drain) of the transistor 210 is coupled to the terminal 116. A second terminal (e.g., source) of the transistor 210 is coupled to the switching terminal 216. A control terminal (e.g., gate) of the transistor 210 is coupled to an output of the controller 114 for receipt of a control signal $Q_{M,aux}$. The transistor 212 is coupled between the switching terminal 216 and the reference terminal 118 (e.g., a ground terminal). A first terminal (e.g., drain) of the transistor 212 is coupled to the switching terminal 216. A second terminal (e.g., source) of the transistor 212 is coupled to the reference terminal 118. A control terminal (e.g., gate) of the transistor 212 is coupled to an output of the controller 114 for receipt of a control signal $Q_{R,aux}$.

The controller 114 controls switching of the transistor 210 and the switching terminal 216, in conjunction with the transistor 110 and the transistor 112, to generate current $i_{L,aux}$, prior to switching of the transistor 110. The current $i_{L,aux}$ can charge the parasitic capacitance of the transistor 110 and reduce the voltage across the transistor 110 to zero or near zero volts to enable ZVS. Accordingly, switching of the half bridge 202 increases the efficiency of the switching converter 200 by providing ZVS of the transistor 110. However, the transistor 210 is subject to hard switching, which can reduce the efficiency of the switching converter 200.

Figure 2B:
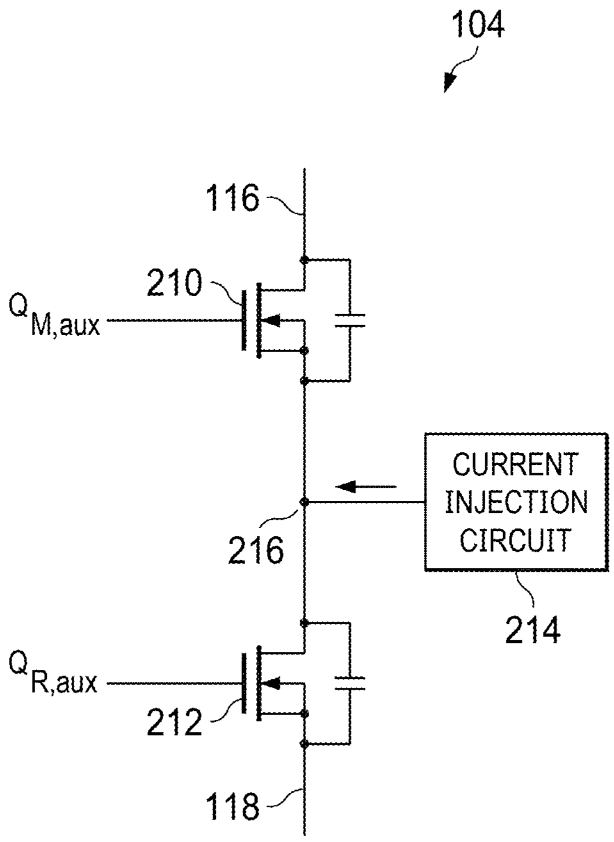
FIG. 2B is a schematic diagram of a portion of the auxiliary driver of FIG. 2A.

The current injection circuit 214 is coupled to the switching terminal 216. FIG. 2B shows the ZVS auxiliary driver 104 including the transistors 210 and 212, and the current injection circuit 214. The current injection circuit 214 generates and injects a current to the switching terminal 216 to charge the parasitic capacitance of the transistor 210, which reduces the voltage across the transistor 210 to zero or near zero to allow ZVS of the transistor 210. Accordingly, the current injection circuit 214 increases the efficiency of the switching converter 200. The current injection circuit 214 can be implemented in various ways as shown in FIGS. 3, 4A, 4B, 6A, and 6B.

Figure 3:
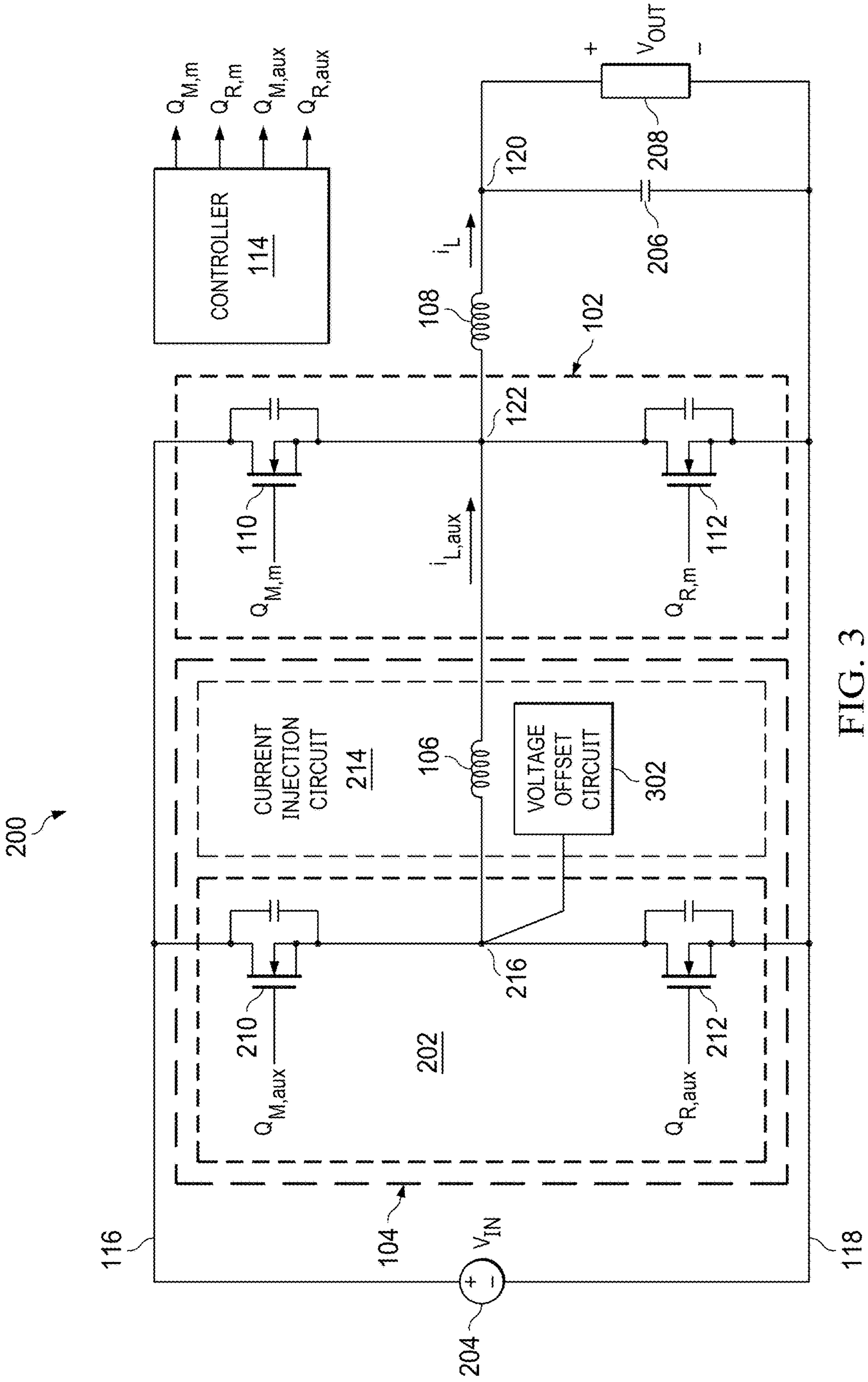
FIG. 3 is a schematic diagram of the switching converter of FIG. 2A showing detail of a first example current injection circuit.

FIG. 3 is a schematic diagram of the switching converter 200 showing an example of the current injection circuit 214. In FIG. 3, the current injection circuit 214 includes the inductor 106 and a voltage offset circuit 302. The inductor 106 and the voltage offset circuit 302 generate the current that is injected into the switching terminal 216 to reduce the voltage across the transistor 210. The voltage offset circuit 302 may include a capacitor, a Zener diode, or other components to generate a voltage offset.

Figure 4A:
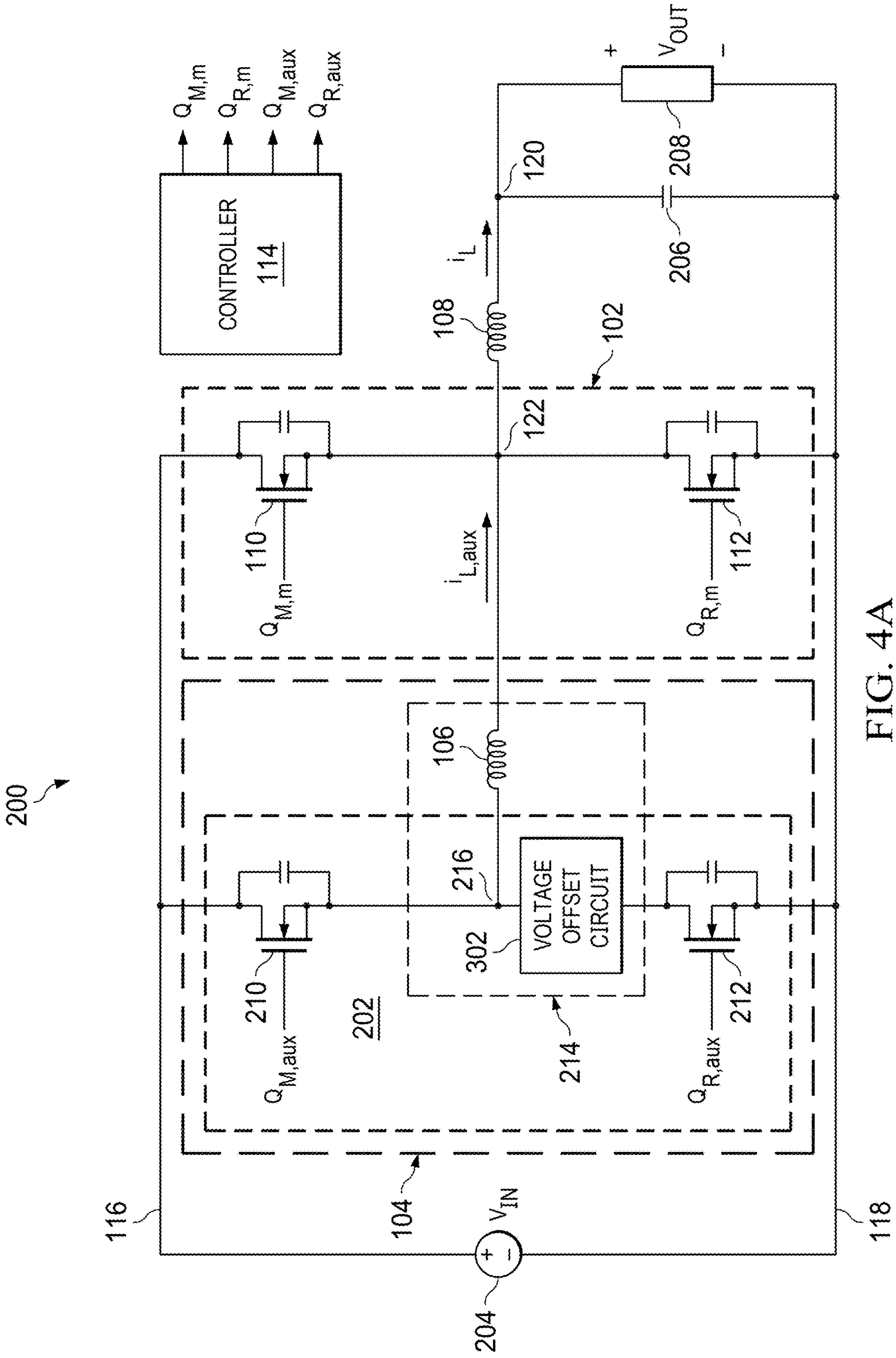
FIG. 4A is a schematic diagram of the switching converter of FIG. 2A showing detail of a second example current injection circuit.

FIG. 4A is a schematic diagram of the switching converter of FIG. 3 showing an example current injection circuit 214. In FIG. 4A, the voltage offset circuit 302 is coupled between the first terminal of the transistor 212 and the switching terminal 216.

Figure 4B:
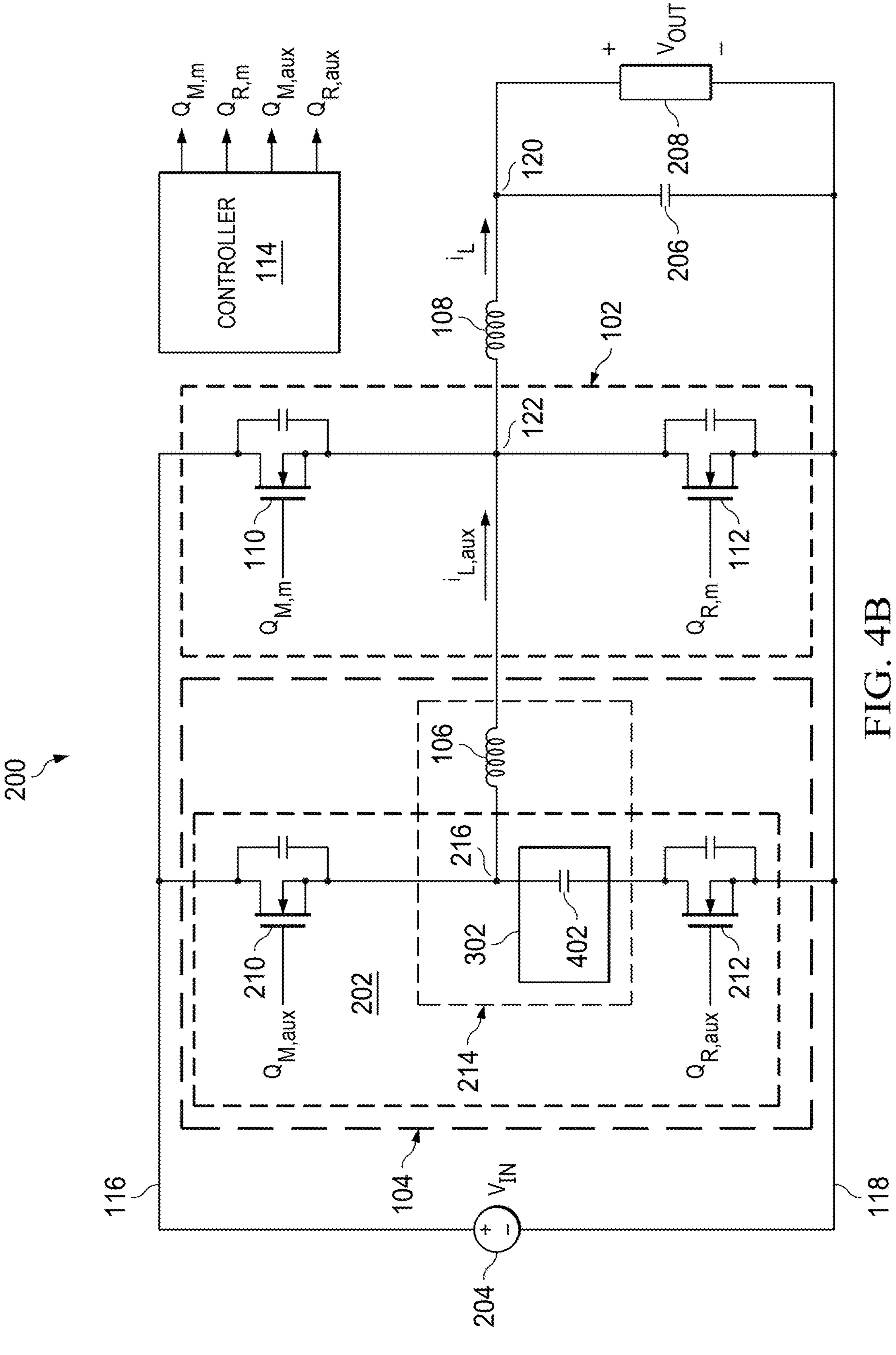
FIG. 4B is a schematic diagram of the switching converter of FIG. 4A where the voltage offset circuit includes a capacitor.

FIG. 4B is a schematic diagram of the switching converter of FIG. 4A. In FIG. 4B, the voltage offset circuit 302 includes a capacitor 402. The capacitor 402 has a first terminal coupled to the switching terminal 216 and a second terminal coupled to the first terminal of the transistor 212. The capacitor 402 has a relatively large capacitance (e.g., in the order of micro Farads) to provide an almost DC voltage within a switching cycle of the switching converter. Resonance between the parasitic capacitance at the switching terminal 216 and the inductor 106 causes the voltage at the switching terminal 216 to increase under control of the controller 114, which allows the transistor 210 to be switched with ZVS, and the efficiency of the switching converter 200 to be increased.

Figure 5A:
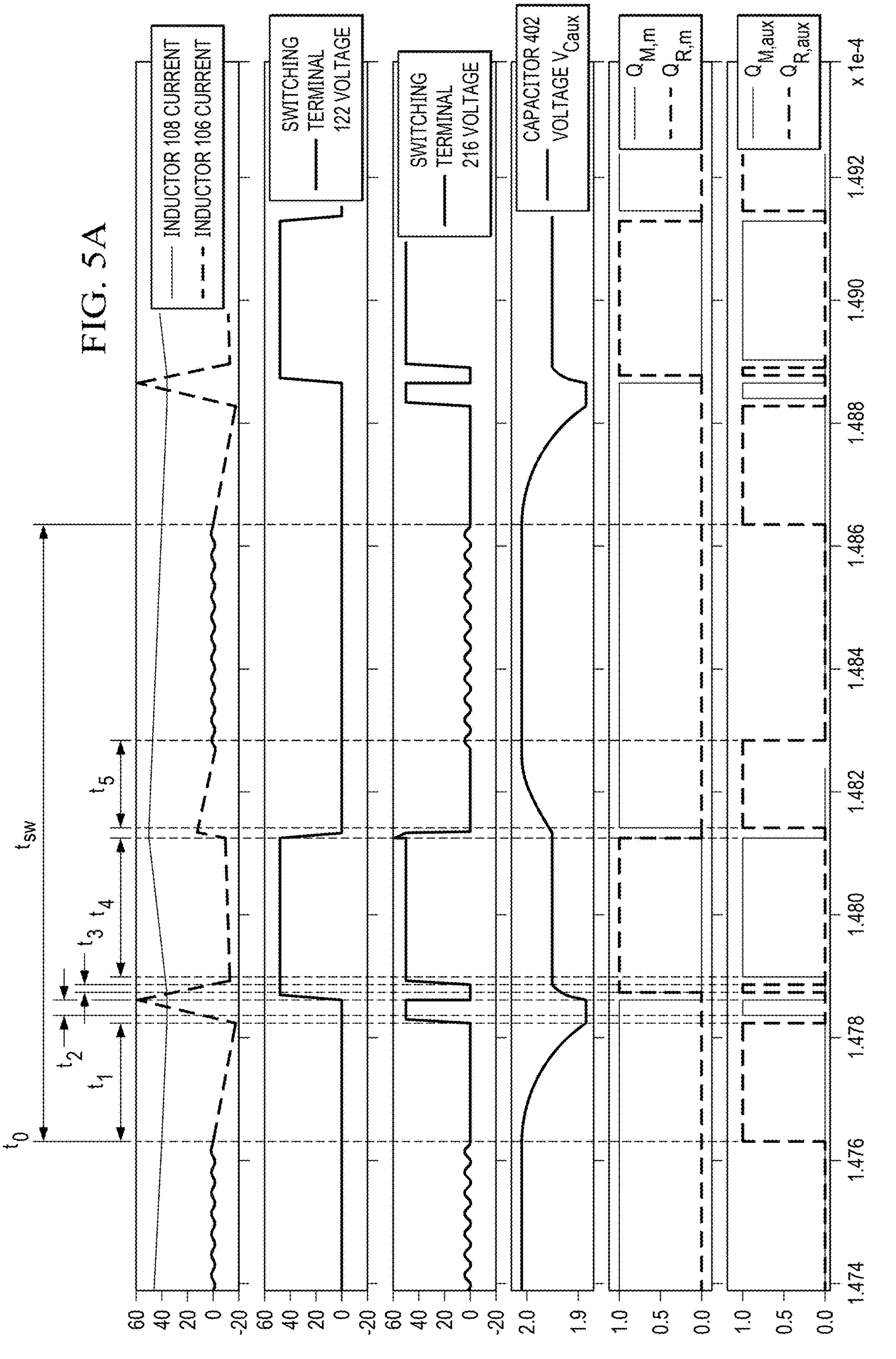
FIGS. 5A and 5B are graphs of example signals in the switching converter of FIG. 4B.
Figure 5B:
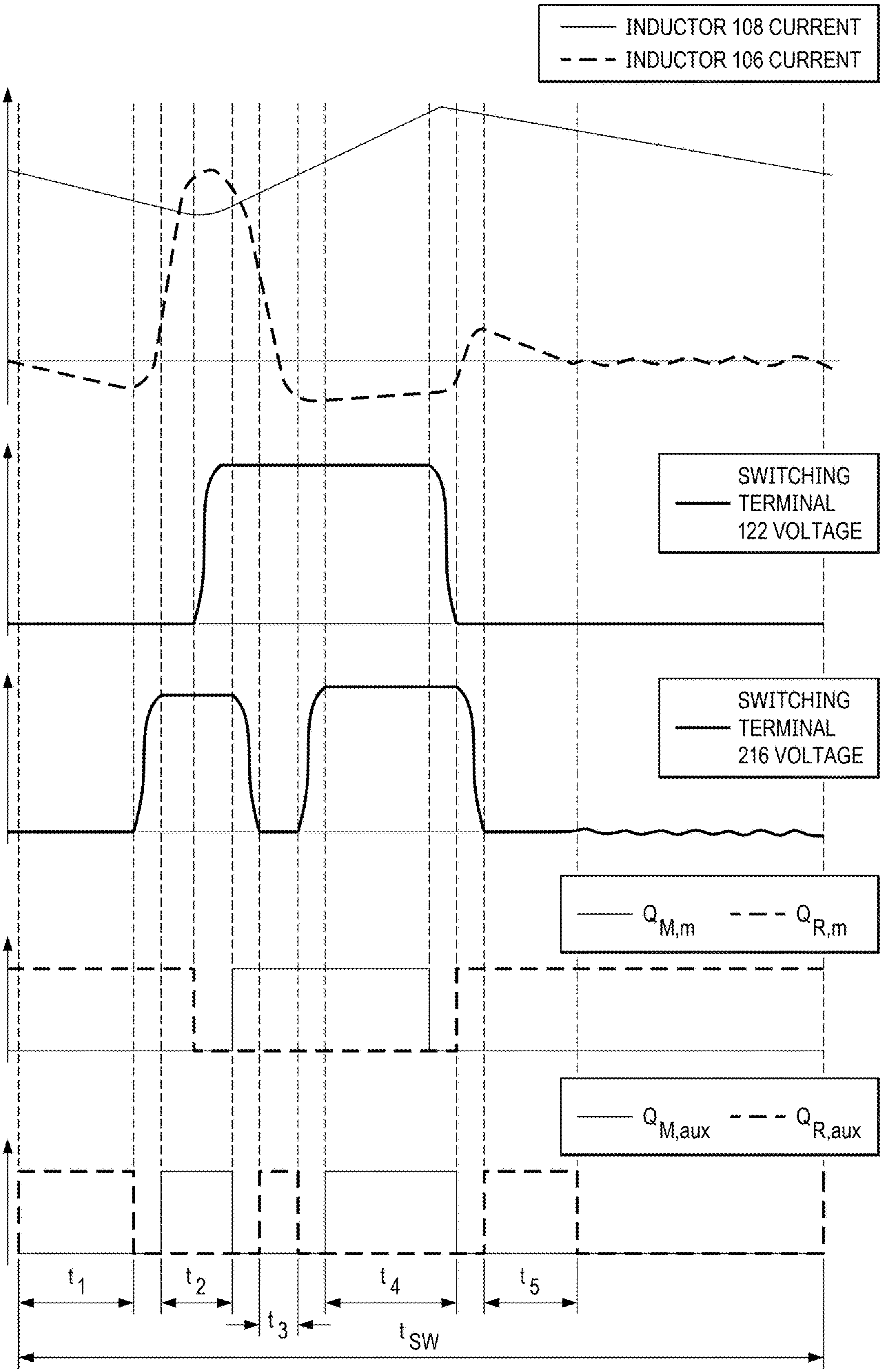

FIGS. 5A and 5B are graphs of example signals in the switching converter of FIG. 4B. FIGS. 5A and 5B show the currents in the inductors 108 and 106, the voltages at the switching terminals 122 and 216, the voltage across the capacitor 402 ($V_{C_{aux}}$), and control signals $Q_{M,m}$, $Q_{R,m}$, $Q_{M,aux}$, and $Q_{R,aux}$. The control signals $Q_{M,m}$, $Q_{R,m}$, $Q_{M,aux}$, and $Q_{R,aux}$ are representative of the states (e.g., on or off) of the transistors 110, 112, 210, and 212, respectively. At time to, the transistors 110, 210, and transistor 212 are off, and the transistor 112 is on. At the start of interval $t_1$, the controller 114 turns on the transistor 212 with zero voltage thereacross. Capacitor 402 stores a voltage $V_{C_{aux}}$. The value of $V_{C_{aux}}$ can be based on the relative durations of $Q_{M,m}$, $Q_{R,m}$, $Q_{M,aux}$, and $Q_{R,aux}$, which sets the relative charging/discharging durations of the capacitor 402 and sets the voltage $V_{C_{aux}}$. The transistor 212 stays on during interval $t_1$, and the current in the inductor 106 decreases due to negative DC voltage $-V_{C_{aux}}$ applied across the inductor 106 by the capacitor 402. The DC voltage on capacitor 402 enables the current ramp down during $t_1$. The negative current can charge the parasitic capacitance of the transistor 210, which enables zero voltage transition (ZVT) of the transistor 210. The duration of $t_1$ directly affects the voltage on the capacitor 402, and therefore affects the peak of the negative current flowing from the inductor 106.

At the end of interval $t_1$, the transistor 212 turns off and the voltage at the switching terminal 216 swings up due to resonant transition (resonance between the inductor 106 and the parasitic capacitance at the switching terminal 216), and the voltage across the transistor 212 is (or close to) zero. At the end of the resonant transition, which is also the beginning of the interval $t_2$, the signal $Q_{M,aux}$ is asserted, and the transistor 210 turns on with zero voltage thereacross, which leads to ZVT of the transistor 210. Addition of the capacitor 402 in series with the transistor 212 enables ZVT of the transistor 210, and the associated increase in efficiency of the switching converter 200.

During interval $t_2$, the input voltage VIN is applied across the inductor 106, and the current in the inductor 106 linearly ramps up. By the end of interval $t_2$, the current in the inductor 106 is larger than the current in the inductor 108, resulting in the current going to the switching terminal 122 becoming negative and charge the parasitic capacitance of the transistor 110, which enables ZVT of the transistor 110. At the end of interval $t_2$, the transistor 112 turns off and the voltage at the switching terminal 122 swings up due to resonant transition (resonance between the inductor 106 and the parasitic capacitance of the switching terminal 122). At the end of the resonant transition, the transistor 110 turns on with zero voltage across thereacross. The ZVS auxiliary driver 104 and the inductor 106 enable ZVS of the transistor 110, and increase the efficiency of the switching converter 200.

As the transistor 110 turns on, the transistor 210 turns off (e.g., at the same time), and the voltage at the switching terminal 216 swings down due to resonant transition (resonance between the inductor 106 and the parasitic capacitance at the switching terminal 216). At the end of the resonant transition, the transistor 212 turns on with zero voltage thereacross. The transistor 212 stays on during interval $t_3$, ramping down the current in the inductor 106, with $-V_{IN}$ applied thereacross.

As the current in the inductor 106 crosses zero (becomes negative), the transistor 212 turns off. As the transistor 212 turns off, the voltage at the switching terminal 216 swings up due to resonant transition (resonance between the inductor 106 and the parasitic capacitance at the switching terminal 216). At the end of the resonant transition, the transistor 210 turns on with zero voltage thereacross. The transistor 210 stays on during interval $t_4$, and the current in the inductor 106 stays slightly negative.

At the end of interval $t_4$, the transistor 110 turns off. As the transistor 110 turns off, the voltage on the switching terminal 216 swings down due to resonant transition (resonance between the inductor 108 and the parasitic capacitance at the switching terminal 216). At the end of the resonant transition, the transistor 112 turns on with zero voltage thereacross. The transistor 112 can stay on for the rest of the switching period ($t_{sw}$).

As the transistor 112 turns on, the transistor 210 turns off at the same time. As the transistor 210 turns off, the voltage on the switching terminal 216 swings down due to resonant transition (resonance between the inductor 106 and the parasitic capacitance at the switching terminal 216). At the end of the resonant transition, the transistor 212 turns on with zero voltage across thereacross.

The transistor 212 stays on during interval $t_5$, and current in the inductor 106 current ramps down due to negative DC voltage $-V_{C_{aux}}$ applied thereacross. The DC voltage $V_{C_{aux}}$ is the voltage on the capacitor 402. As the current in the inductor 106 reaches zero, the transistor 212 turns off. The transistor 212 remains off for the rest of the switching period, with zero volts thereacross.

Figure 6A:
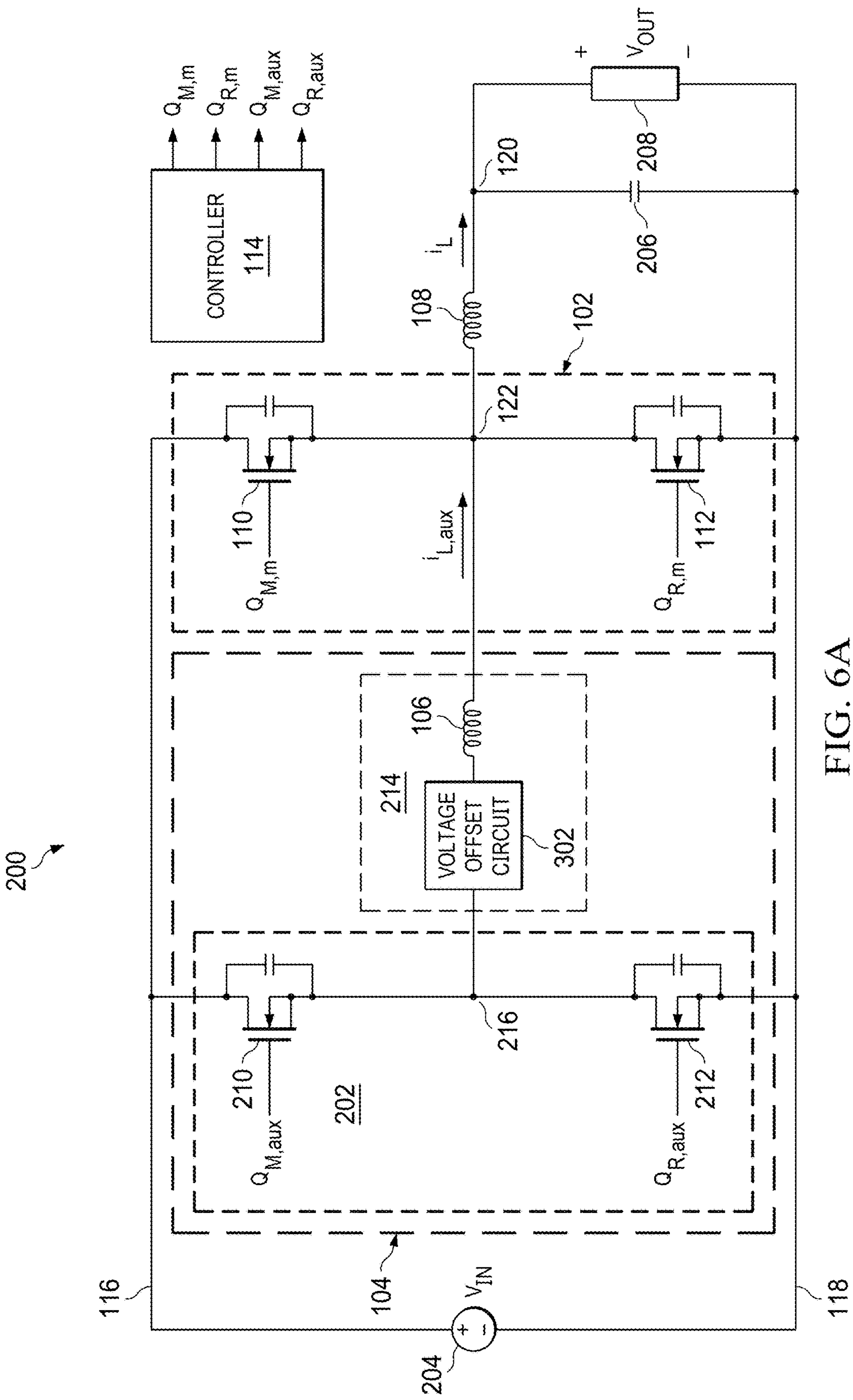
FIG. 6A is a schematic diagram of the switching converter of FIG. 2A showing detail of a third example current injection circuit.

FIG. 6A is a schematic diagram of the switching converter of FIG. 3 showing an example current injection circuit 214. In FIG. 6A, the voltage offset circuit 302 is coupled between the switching terminal 216 and the inductor 106. Addition of the voltage offset circuit 302 in series with inductor 106 allows the use of the half bridge 202 without modification (e.g., the connection between the transistor 212 and the switching terminal 216 is not broken as in FIG. 4A). For example, in FIG. 6A, half bridges 102 and 202 can be on an integrated circuit with a first chip interconnect (e.g., a first bump, a first pad, etc.) for switching terminal 216 and a second chip interconnect (e.g., a second bump, a second pad, etc.) for switching terminal 122, and voltage offset circuit 302 and the inductor 106 can be coupled in series between the first and second chip interconnects. In contrast, in the example of FIG. 4A, the integrated circuit including half bridges 102 and 202 may include an additional chip interconnect, such as a third chip interconnect (e.g., a third bump, a third pad, etc.) to connect the transistor 212 to the voltage offset circuit 302, which can increase cost. On the other hand, the example of FIG. 4A can provide reduced current through the inductor 106, which can improve efficiency.

Figure 6B:
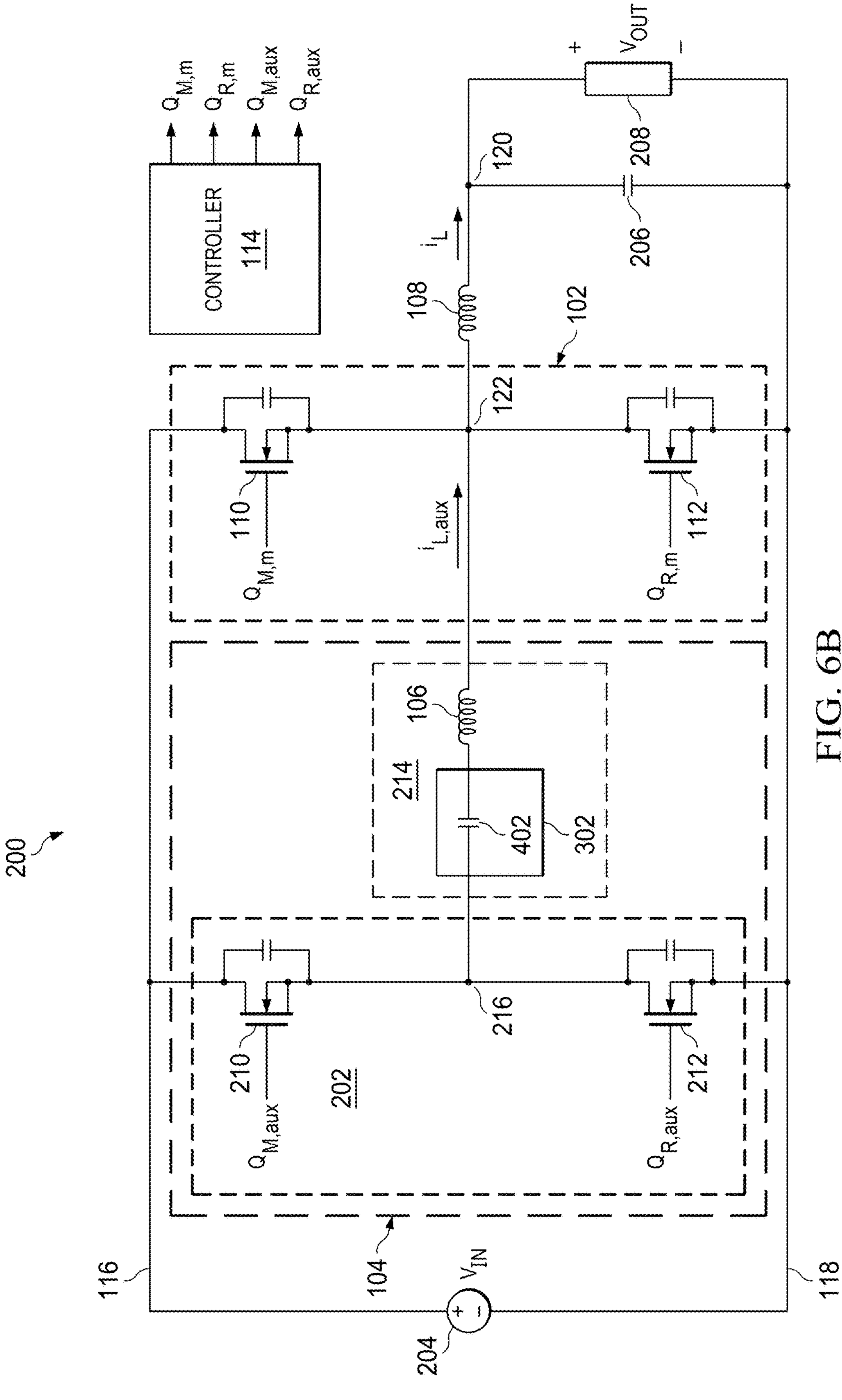
FIG. 6B is a schematic diagram of the switching converter of FIG. 6A where the voltage offset circuit includes a capacitor.

FIG. 6B is a schematic diagram of the switching converter of FIG. 6A. In FIG. 6B, the voltage offset circuit 302 includes the capacitor 402. The capacitor 402 has a first terminal coupled to the switching terminal 216 and a second terminal coupled to the inductor 106. Capacitor 402 can apply a negative voltage across the inductor 106, which causes a negative current to flow through the inductor 106 into the switching terminal 216 to charge the parasitic capacitance of the switching terminal 216, which allows the transistor 210 to be switched with ZVS, and the efficiency of the switching converter 200 to be increased.

Figure 7A:
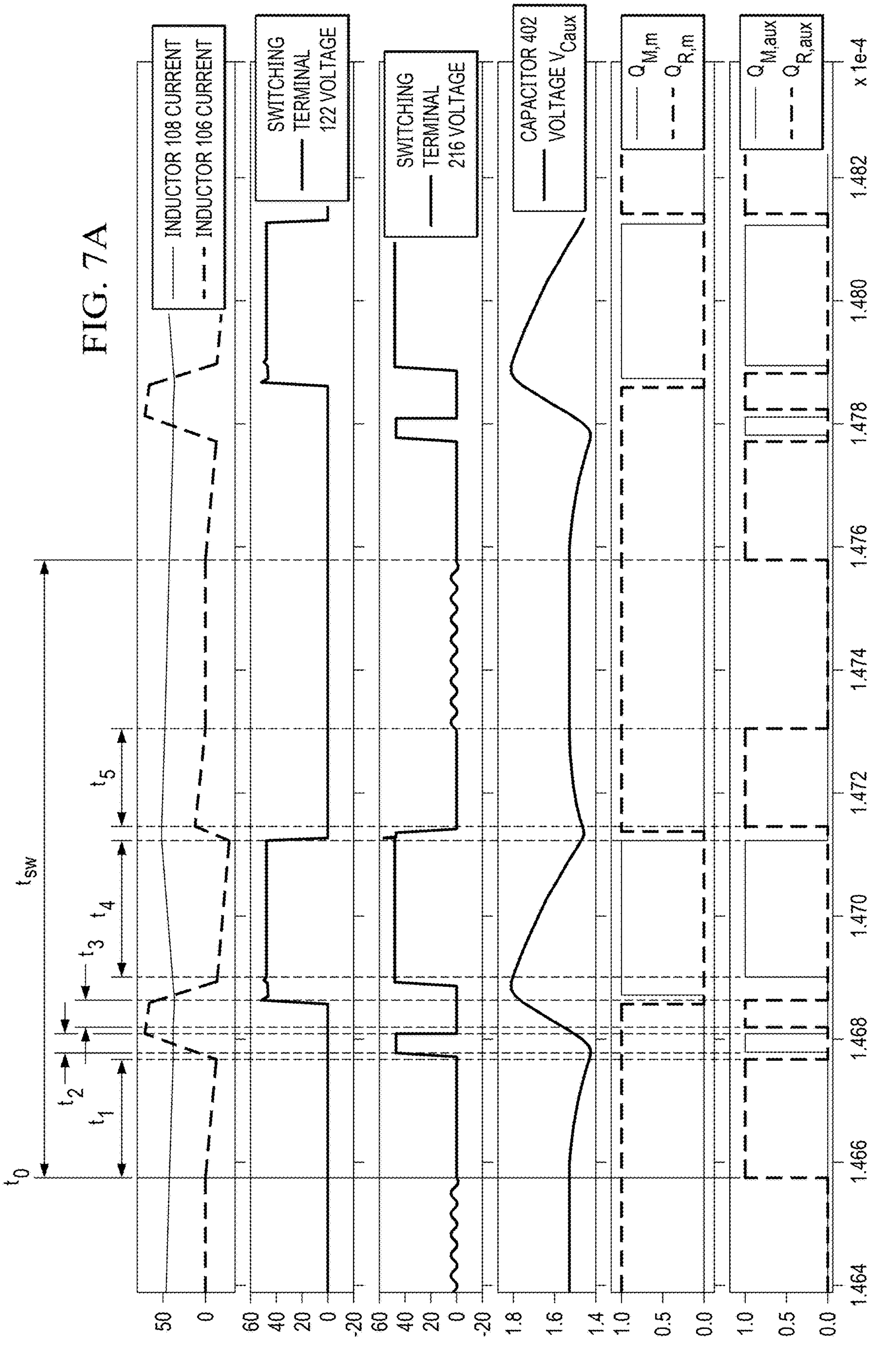
FIGS. 7A and 7B are graphs of example signals in the switching converter of FIG. 6B.
Figure 7B:
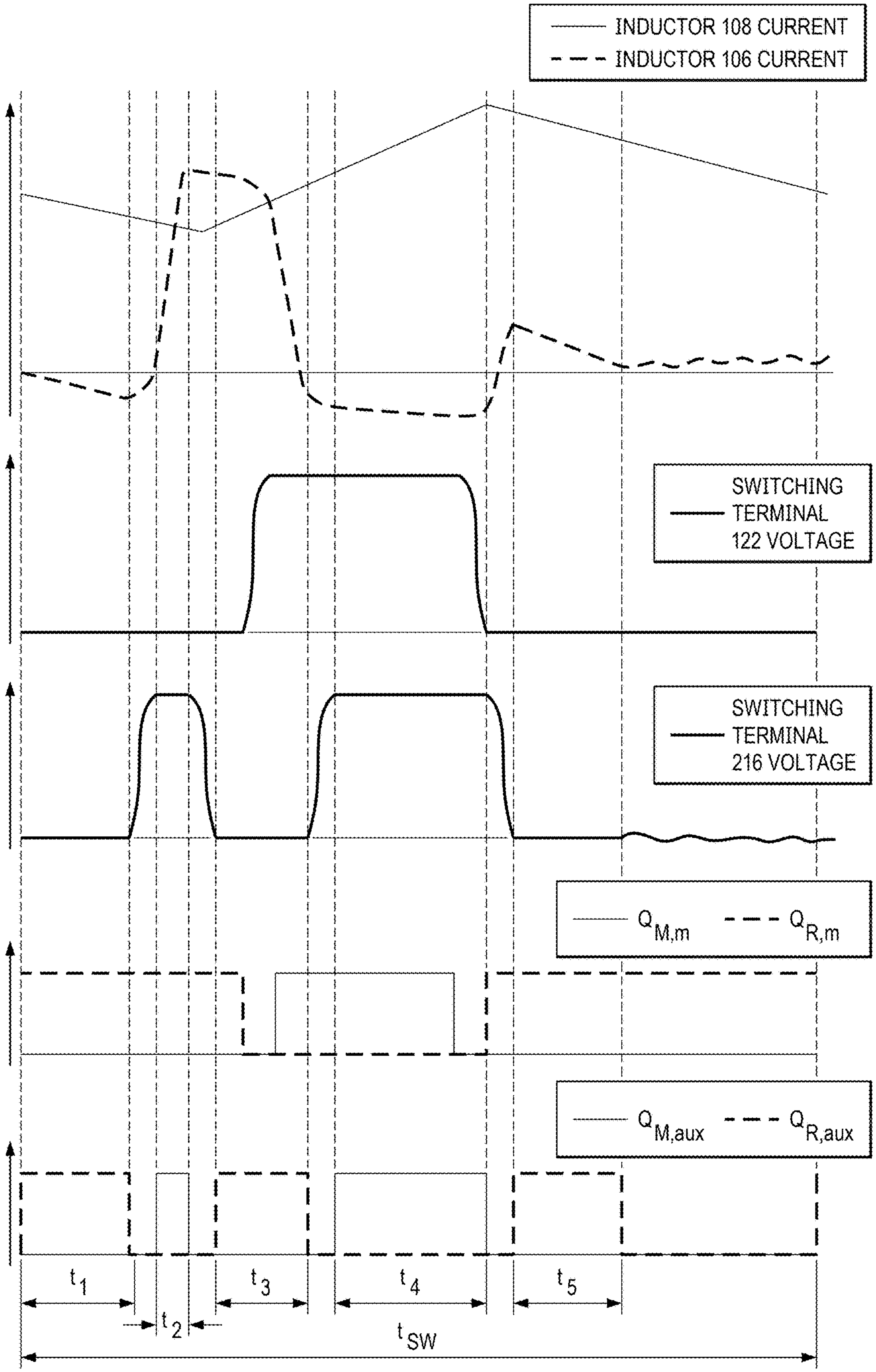

FIGS. 7A and 7B are graphs of example signals in the switching converter of FIG. 6B. FIGS. 7A and 7B show the currents in the inductors 108 and 106, the voltages at the switching terminals 122 and 216, the voltage across the capacitor 402, and control signals $Q_{M,m}$, $Q_{R,m}$, $Q_{M,aux}$, and $Q_{R,aux}$. The control signals $Q_{M,m}$, $Q_{R,m}$, $Q_{M,aux}$, and $Q_{R,aux}$ are representative of the states (e.g., on or off) of the transistors 110, 112, 210, and 212, respectively. Capacitor 402 stores a voltage $V_{C_{aux}}$. The value of $V_{C_{aux}}$ can be based on the relative durations of $Q_{M,m}$, $Q_{R,m}$, $Q_{M,aux}$, and $Q_{R,aux}$, which sets the relative charging/discharging durations of the capacitor 402 and sets the voltage $V_{C_{aux}}$. Also, because the capacitor 402 and the inductor 106 are in series, and the capacitor 402 is DC-blocking, the voltage $V_{C_{aux}}$ is such that the DC current (or an averaged sum of the negative and positive current) across the inductor 106 is zero.

At time to, the transistor 112 is on, and the transistors 110, 210, and transistor 212 are off. At the start of interval $t_1$, the transistor 212 turns on with ZVS. The transistor 212 stays on during interval $t_1$, during which the current in the inductor 106 ramps down due to negative DC voltage $-V_{C_{aux}}$ applied thereacross by the capacitor 402. The DC voltage on the capacitor 402 enables the current ramp down during interval $t_1$. The negative current in the inductor 106 enables ZVS of the transistor 210.

At the end of interval $t_1$, the transistor 212 turns off and the voltage at the switching terminal 216 swings up due to resonant transition (resonance between the inductor 106 and the parasitic capacitance of the switching terminal 216). At the end of the resonant transition, the transistor 210 turns on with ZVS. Addition of the capacitor 402 in series with the inductor 106 enables ZVS of the transistor 210, and the associated increase in efficiency of the switching converter 200.

During interval $t_2$, the input voltage $V_{IN}$ is applied across the inductor 106, and the current in the inductor 106 linearly ramps up. In the deadtime between intervals $t_2$ and $t_3$ (when transistors 210 and 212 are off), the resonant transition between the inductor 106 and the capacitor 402 brings the voltage at the switching terminal 216 to zero, and the transistor 212 turns on with zero voltage switching at the start of interval $t_3$.

During interval t3, the transistor 212 stays on, and the current in the inductor 106 stays relatively constant until the transistor 112 is turned off. When the transistor 112 turns off (during t3), the current in the inductor 106 is larger than the current in the inductor 108, causing the current flowing in the switching terminal 122 to become negative, which enables zero voltage switching of the transistor 110, and the voltage at the switching terminal 122 swings up due to the resonance between the inductor 106 and the parasitic capacitance of the switching terminal 122. At the end of the resonant transition (still during interval t3), the transistor 110 turns on with ZVS. The ZVS auxiliary driver 104 and the inductor 106 enable ZVS of the transistor 110, and increase the efficiency of the switching converter 200.

Also, the durations of $t_2$ and $t_3$ are set based on a target peak negative current during the interval $t_1$, so that the averaged sum of the positive and negative current through the inductor 106 is zero (due to being in series with the capacitor 402). For example, the durations of $t_2$ and $t_3$ can be increased to increase the positive current, which allow the peak negative current during the interval $t_1$ to be increased.

After the transistor 110 is turned on, a negative voltage (−VIN plus the voltage on the capacitor 402) is applied across the inductor 106, and the current through the inductor 106 ramps down linearly (still during $t_3$). As the current in the inductor 106 crosses zero (becomes negative), the transistor 212 is turned off (at the end of interval t3), and the voltage at the switching terminal 216 swings up (a resonant transition) due to resonance between the inductor 106 and the parasitic capacitance at the switching terminal 216. At the end of the resonant transition, the transistor 210 turns on with ZVS (at the start of interval $t_4$). The transistor 210 stays on during interval $t_4$ and the current flowing in the inductor 106 stays slightly negative. The duration of the interval $t_3$ impacts the DC voltage on the capacitor 402, and therefore the peak negative current. The interval t3 can be zero or some finite time (e.g., a time in nanoseconds).

Just before the end of interval $t_4$, the transistor 110 is turned off. As the transistor 110 turns off, the voltage on the switching terminal 122 swings down due to resonant transition (resonance between the inductor 108 and the parasitic capacitance at the switching terminal 122). At the end of the resonant transition, the transistor 112 turns on with ZVS (at the end of the interval $t_4$). The transistor 112 stays on for the rest of the switching period.

As the transistor 112 turns on, the transistor 210 turns off at the same time (at the end of interval $t_4$). As the transistor 210 turns off, the voltage on the switching terminal 216 swings down due to resonant transition (resonance between the inductor 106 and the parasitic capacitance at the switching terminal 216). At the end of the resonant transition, the transistor 212 turns on with ZVS.

The transistor 212 stays on during interval $t_5$, and current in the inductor 106 ramps down due to negative DC voltage $-V_{C_{aux}}$ applied across the inductor 106. The DC voltage $V_{C_{aux}}$ is the voltage on the capacitor 402. As the current in the inductor 106 reaches zero, the transistor 212 turns off. The transistor 212 remains off for the rest of the switching period, with zero volts thereacross.

Besides the examples shown in FIGS. 4-7B, current injection circuit 214 can be implemented using other components, such as a switchable current source. The current source can be enabled during the interval $t_1$ to charge the parasitic capacitance of the transistor 210 prior to turning it on, and can be disabled before and after the interval $t_1$.

Figure 8:
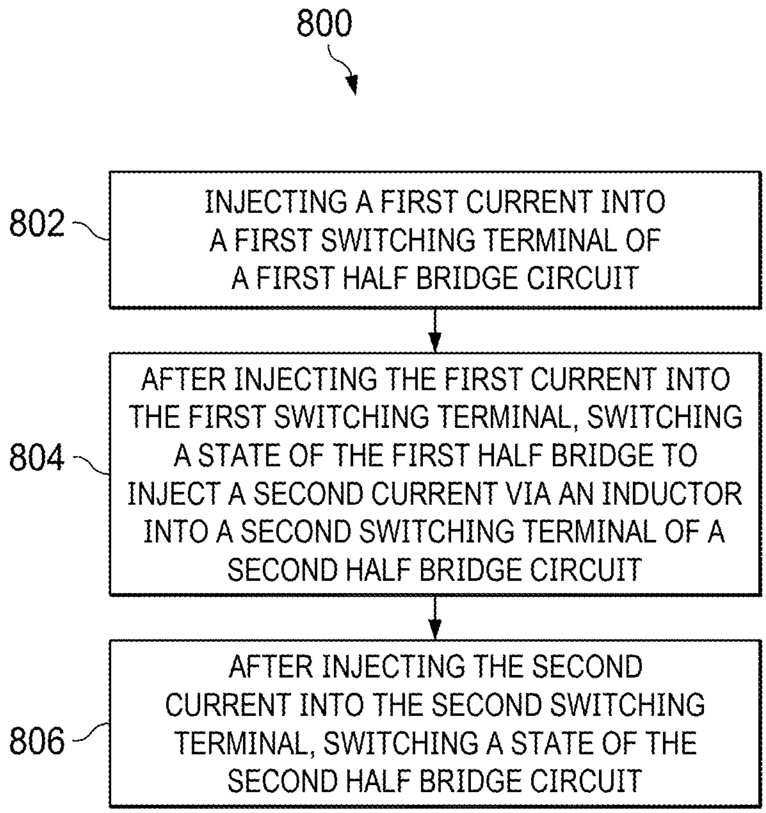
FIG. 8 is a flow diagram for an example method for improving efficiency of a switching converter.

FIG. 8 is a flow diagram for an example method 800 for improving efficiency of a switching converter. Though depicted sequentially as a matter of convenience, at least some of the actions shown can be performed in a different order and/or performed in parallel. Additionally, some implementations may perform only some of the actions shown. Operations of the method 800 can be performed by an example of the switching converter 100 or the switching converter 200.

In block 802, the current injection circuit 214 injects a current into the switching terminal 216 of the half bridge 202. The current can reduce the voltage across the transistor 210 of the half bridge 202 to zero or near zero. The current injection circuit 214 can inject the current by applying a negative voltage across the inductor 106, where the voltage of switching terminal 216 is raised with respect to switching terminal 122.

In some examples, the negative voltage can be provided by the voltage offset circuit 302, which can be coupled between the switching terminal 216 and the transistor 212 as shown in FIG. 4A and FIG. 4B, or coupled in series with the inductor 106 between the switching terminal 216 and the switching terminal 122. A current can be injected into the switching terminal 216 within an interval $t_1$ by asserting control signals $Q_{M,m}$ and $Q_{R,aux}$ to turn on transistors 110 and 212 as shown in FIGS. 5A and 5B and FIGS. 7A and 7B.

In block 804, after injecting the current into the switching terminal 216 of the half bridge 202, a state of the half bridge 202 is switched. For example, the transistor 210 is switched from off to on within interval $t_2$ as shown in FIGS. 5A and 5B and FIGS. 7A and 7B. Because the current injected in block 802 reduces the voltage across the transistor 210, the transistor 210 can be turned on with ZVS. Switching the transistor 210 with ZVS can reduce power loss in switching of half bridge 202 and increase the efficiency of the switching converter 200. Switching the state of the half bridge 202 can inject, via the inductor 106, a current into the switching terminal 122 of the half bridge 102, which in turn enables ZVS of transistor 110.

In block 806, after injecting the current into the switching terminal 122 of the half bridge 102, a state of the half bridge 102 can be switched. The current injected into the switching terminal 122 can reduce the voltage across the transistor 110 of the half bridge 102 to zero or near zero. Changing the state of the half bridge 102 can include switching the transistor 110 from off to on with ZVS at the end of $t_2$. Switching the transistor 110 with ZVS can increase the efficiency of the switching converter 200.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "on" means that the conduction channel of the FET is present and drain current may flow through the FET. References herein to a FET being "off" means that the conduction channel is not present and drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. An apparatus comprising:

a first transistor coupled between a power terminal and a first switching terminal, the first transistor having a first control terminal;

a second transistor coupled between the first switching terminal and a reference terminal, the second transistor having a second control terminal;

a third transistor coupled between the power terminal and a second switching terminal, the third transistor having a third control terminal;

a fourth transistor coupled between the second switching terminal and the reference terminal, the fourth transistor having a fourth control terminal;

an inductor coupled between the first and second switching terminals; and a current injection circuit coupled to the first switching terminal, wherein the current injection circuit includes a voltage offset circuit coupled between the inductor and at least one of the first transistor or the second transistor.

2. The apparatus of claim 1, wherein the current injection circuit is configurable to, prior to a state change of the first control terminal to enable the first transistor, inject a current into the first switching terminal.

3. The apparatus of claim 2, wherein the voltage offset circuit is configurable to set a voltage across the inductor prior to the state change of the first control terminal.

4. The apparatus of claim 3, wherein the voltage offset circuit includes a capacitor.

5. The apparatus of claim 3, wherein the voltage offset circuit is coupled between the first switching terminal and one of the first or second transistor.

6. The apparatus of claim 3, wherein the voltage offset circuit is coupled between the first switching terminal and the inductor.

7. The apparatus of claim 1, further comprising a controller coupled to the first, second, third, and fourth control terminals, the controller configurable to:

cause the current injection circuit to inject a first current into the first switching terminal;

after injecting the first current into the first switching terminal, switch respective states of at least one of the first transistor or the second transistor to inject a second current into the second switching terminal via the inductor; and after injecting the second current into the second switching terminal, switch respective states of at least one of the third or fourth transistor.

8. The apparatus of claim 7, wherein the current injection circuit is configurable to provide the first current such that a voltage across the first transistor is reduced to zero.

9. The apparatus of claim 7, wherein the controller is configurable to turn off the second transistor with the first and third transistors off and the fourth transistor on to cause the current injection circuit to inject the first current.

10. The apparatus of claim 7, wherein the controller is configurable to:

turn on the fourth transistor with zero voltage thereacross, and turn off the first transistor;

turn on the second transistor responsive to a voltage across the second transistor being zero; and turn off the second transistor responsive to a current through the inductor being zero.

11. The apparatus of claim 7, wherein the controller is configurable to switch the state of the third transistor responsive to a voltage across the third transistor being reduced to zero by the second current.

12. The apparatus of claim 7, wherein the controller is configurable to:

within a first interval, turn on the second transistor and the fourth transistor, and turn off the first transistor and the third transistor;

within a second interval, turn on the first transistor, turn off the second transistor, and turn off the fourth transistor after turning on the first transistor;

after the second interval ends, turn on the third transistor;

within a third interval with the third transistor turned on, turn on the second transistor and turn off the first transistor;

within a fourth interval, turn on the first transistor and turn off the second transistor, and turn off the third transistor before end of the fourth interval;

after the fourth interval ends, turn on the fourth transistor; and within a fifth interval with the fourth transistor turned on, turn on the second transistor and turn off the first transistor.

13. The apparatus of claim 7, wherein the controller is configurable to:

within a first interval, turn on the second transistor and the fourth transistor, and turn off the first transistor and the third transistor;

within a second interval with the fourth transistor turned on, turn on the first transistor, and turn off the second transistor;

within a third interval, turn on the second transistor and turn off the first transistor, turn off the fourth transistor after turning on the second transistor, and turn on the third transistor after turning off the fourth transistor;

within a fourth interval, turn on the first transistor and turn off the second transistor, and turn off the third transistor before end of the fourth interval;

after the fourth interval ends, turn on the fourth transistor; and within a fifth interval with the fourth transistor turned on, turn on the second transistor and turn off the first transistor.

14. A method comprising:

injecting, by a current injection circuit, a first current into a first switching terminal of a first half bridge having a first transistor and a second transistor;

after injecting the first current, switching a state of the first half bridge to inject a second current via an inductor into a second switching terminal of a second half bridge, wherein the current injection circuit includes a voltage offset circuit coupled between the inductor and at least one of the first transistor or the second transistor; and after injecting the second current, switching a state of the second half bridge.

15. The method of claim 14, further comprising reducing a voltage across the first transistor of the first half bridge to zero by injection of the first current.

16. The method of claim 15, further comprising switching the state of the first transistor responsive to the voltage across the first transistor being reduced to zero.

17. The method of claim 14, further comprising reducing a voltage across a first transistor of the second half bridge to zero by injection of the second current.

18. The method of claim 17, further comprising switching the state of the first transistor of the second half bridge responsive to the voltage across the first transistor of the second half bridge being reduced to zero.

19. A system comprising:

a first half bridge including a first transistor and a second transistor coupled to a first switching terminal;

a second half bridge including a third transistor and a fourth transistor coupled to a second switching terminal;

an inductor coupled between the first switching terminal and the second switching terminal;

a current injection circuit coupled to the first switching terminal, wherein the current injection circuit includes a voltage offset circuit coupled between the inductor and at least one of the first transistor or the second transistor; and a controller coupled to the first transistor, the second transistor, the third transistor, and the fourth transistor.

20. The system of claim 19, wherein the current injection circuit includes a capacitor coupled between the first switching terminal and the inductor.

21. The system of claim 19, wherein:

the first transistor is coupled between a power terminal and the first switching terminal, and the second transistor is coupled between a reference terminal and the first switching terminal; and the current injection circuit includes a capacitor coupled between the second transistor and the first switching terminal.

22. The system of claim 19, wherein the controller is configurable to:

cause the current injection circuit to inject a first current into the first switching terminal; and after injecting the first current into the first switching terminal, switch a state of the first transistor responsive to the first current reducing a voltage across the first transistor to zero.

* * * * *